US008659866B2

(12) United States Patent
Douglass et al.

(10) Patent No.: US 8,659,866 B2
(45) Date of Patent: Feb. 25, 2014

(54) COMPACT TRANSIENT VOLTAGE SURGE SUPPRESSION DEVICE

(75) Inventors: Robert Stephen Douglass, Wildwood, MO (US); Hundi Panduranga Kamath, Los Altos, CA (US)

(73) Assignee: Cooper Technologies Company, Houston, TX (US)

( * ) Notice: Subject to any disclaimer, the term of this patent is extended or adjusted under 35 U.S.C. 154(b) by 271 days.

(21) Appl. No.: 12/870,452

(22) Filed: Aug. 27, 2010

(65) Prior Publication Data

US 2012/0050936 A1 Mar. 1, 2012

(51) Int. Cl.
*H02H 1/00* (2006.01)

(52) U.S. Cl.
USPC .......................................... 361/117; 361/120

(58) Field of Classification Search
USPC .......................................... 361/117–120, 127
See application file for complete search history.

(56) References Cited

U.S. PATENT DOCUMENTS

| | | | | |
|---|---|---|---|---|
| 4,493,005 | A | 1/1985 | Lange | |
| 5,220,480 | A | 6/1993 | Kershaw, Jr. et al. | |
| 5,311,393 | A | 5/1994 | Bird | |
| 5,379,177 | A | 1/1995 | Bird | |
| 5,408,379 | A * | 4/1995 | Oguchi et al. | 361/55 |
| 5,519,564 | A | 5/1996 | Carpenter, Jr. | |
| 5,608,596 | A | 3/1997 | Smith et al. | |
| 5,781,394 | A | 7/1998 | Lorenz et al. | |
| 5,808,850 | A | 9/1998 | Carpenter, Jr. | |
| 5,956,223 | A | 9/1999 | Banting | |
| 6,040,971 | A | 3/2000 | Martenson et al. | |
| 6,430,019 | B1 | 8/2002 | Martenson et al. | |
| 6,876,533 | B1 | 4/2005 | Ryan | |
| 7,411,769 | B2 | 8/2008 | Schimanski et al. | |
| 7,477,503 | B2 | 1/2009 | Aszmus | |
| 7,483,252 | B2 * | 1/2009 | de Palma et al. | 361/127 |
| RE42,319 | E * | 5/2011 | Martenson et al. | 361/124 |
| 2006/0245125 | A1 | 11/2006 | Aszmus | |
| 2008/0100981 | A1 * | 5/2008 | Chen et al. | 361/118 |
| 2009/0027157 | A1 * | 1/2009 | Katsumura et al. | 338/21 |

FOREIGN PATENT DOCUMENTS

| | | | |
|---|---|---|---|
| DE | 9414357.9 | U1 | 10/1994 |
| DE | 102010008537 | A1 | 8/2011 |
| EP | 2256750 | A1 | 12/2010 |
| WO | 2006119133 | A1 | 11/2006 |
| WO | 2007105066 | A1 | 9/2007 |
| WO | 2008069870 | A1 | 6/2008 |
| WO | 2008104824 | A1 | 9/2008 |
| WO | 2009038418 | A2 | 3/2009 |

OTHER PUBLICATIONS

International Search Report and Written Opinion of PCT/US2011/048239; Dec. 14, 2011; 13 pages.
International Search Report and Written Opnion for PCT/US2011/048583, 23 pages, dated May 10, 2012.
TPMOV® Surge Suppression; Ferraz Shawmut; 2 pages.
International Preliminary Report on Patentability and Written Opinion of PCT/US2011/048239; Mar. 14, 2013; 8 pages.
International Preliminary Report on Patentability and Written Opinion of PCT/US2011/048583; Mar. 14, 2013; 11 pages.

* cited by examiner

*Primary Examiner* — Danny Nguyen
(74) *Attorney, Agent, or Firm* — Armstrong Teasdale LLP

(57) ABSTRACT

A transient voltage surge suppression device includes a varistor assembly having a compact thickness, and two different disconnect elements responsive to distinct overvoltage conditions to disconnect a varistor assembly prior catastrophic failure thereof.

40 Claims, 14 Drawing Sheets

COMPACT TRANSIENT VOLTAGE SURGE SUPPRESSION DEVICE

BACKGROUND OF THE INVENTION

The field of the invention relates generally to circuit protection devices, and more specifically to transient voltage surge suppression devices.

Transient voltage surge suppression devices, sometimes referred to as surge protection devices, have been developed in response to the need to protect an ever-expanding number of electronic devices upon which today's technological society depends from high voltages of a short, or transient duration. Electrical transient voltages can be created by, for example, electrostatic discharge or transients propagated by human contact with electronic devices themselves, or via certain conditions in line side electrical circuitry powering the electronic devices. Thus, it is not uncommon for electronic devices to include internal transient voltage surge suppression devices designed to protect the device from certain overvoltage conditions or surges, and also for line side circuitry powering the electronic devices in an electrical power distribution system to include transient voltage surge suppression devices. Examples of electrical equipment which typically employ transient voltage protection equipment include telecommunications systems, computer systems and control systems.

Transient voltage surge suppression devices for electrical power systems are commonly employed to protect designated circuitry, which may include expensive pieces of electrical equipment, critical loads, or associated electronic devices powered by the system. The surge suppression devices normally exhibit a high impedance, but when an over-voltage event occurs, the devices switch to a low impendence state so as to shunt or divert over-voltage-induced current to electrical ground. Damaging currents are therefore diverted from flowing to associated load side circuitry, thereby protecting the corresponding equipment, loads and electronic devices from damage. Improvements, however, are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
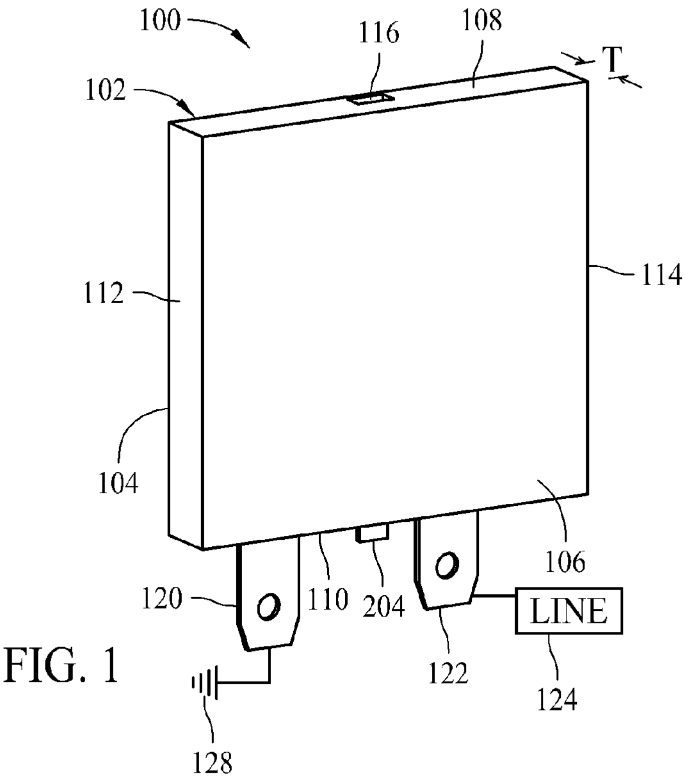
FIG. 1 is a perspective view of an exemplary surge suppression device.

Electrical power systems are subject to voltages within a fairly narrow range under normal operating conditions. However, system disturbances, such as lightning strikes and switching surges, may produce momentary or extended voltage levels that exceed the levels experienced by the circuitry during normal operating conditions. These voltage variations often are referred to as over-voltage conditions. As mentioned previously, transient surge suppression devices have been developed to protect circuitry against such over-voltage conditions.

Transient surge suppression devices typically include one or more voltage-dependent, nonlinear resistive elements, referred to as varistors, which may be, for example, metal oxide varistors (MOV's). A varistor is characterized by having a relatively high resistance when exposed to a normal operating voltage, and a much lower resistance when exposed to a larger voltage, such as is associated with over-voltage conditions. The impedance of the current path through the varistor is substantially lower than the impedance of the circuitry being protected when the device is operating in the low-impedance mode, and is otherwise substantially higher than the impedance of the protected circuitry. As over-voltage conditions arise, the varistors switch from the high impedance mode to the low impedance mode and shunt or divert over-voltage-induced current surges away from the protected circuitry and to electrical ground, and as over-voltage conditions subside, the varistors return to a high impedance mode.

While existing transient surge suppression devices have enjoyed some success in protecting electrical power systems and circuitry from transient over-voltage events, they are susceptible to certain failure modes that may nonetheless result in damage to the load side circuitry that the transient voltage suppression device was intended to protect.

More specifically, in response to extreme over-voltage events (i.e., very high over-voltage conditions), the varistors switch very rapidly to the low impedance mode, and because of exposure to extremely high voltage and current the varistors degrade rapidly and sometimes fail, perhaps catastrophically. Catastrophic failure of surge suppression devices can itself cause damage to the load side circuitry intended to be protected.

Still another problem with known transient surge suppression devices is that if overvoltage conditions are sustained for a period of time, even for low to moderate over-voltage conditions, the varistors (e.g., MOVs) can overheat and fail, sometimes catastrophically. If the failure occurs when the MOV is in a conductive state, short circuit conditions and electrical arcing may result that could lead to further damage.

To address such problems, known surge suppression devices have been used in combination with a series connected fuse or circuit breaker. As such, the fuses or circuit breakers can more effectively respond to overcurrent conditions resulting from over-voltage conditions in which, at least for some duration of time, the varistor in the surge suppression device is incapable of completely suppressing over-voltage conditions.

While series connected transient surge suppression devices and fuses or breakers can be effective to open circuitry in response to over-voltage conditions that could otherwise cause damage, this is not a completely satisfactory solution. In cases wherein the MOV's become partially conductive due to sustained overvoltage conditions, the fuse or breaker may not operate if the current flowing through the MOV is below the rating of the fuse or breaker. In such conditions, even relatively small currents flowing through the MOV over a length of time can produce thermal runaway conditions and excessive heat in the MOV that can lead to its failure. As mentioned above, this can lead to short circuit conditions and perhaps a catastrophic failure of the device presents practical concerns.

Aside from the performance and reliability issues noted above, additional cost and installation space is required for the series connected transient surge suppression devices and fuses or breakers. Additional maintenance issues result from having such series connected components as well.

Some effort has been made to provide a transient voltage surge protection device that provides safe and effective operation for a full range of over-voltage conditions, while avoiding catastrophic failure of the varistor element. For example, Ferraz Shawmut has introduced a thermally protected surge suppression device marketed as a TPMOV® device. The TPMOV® device is described in U.S. Pat. No. 6,430,019 and includes thermal protection features designed to disconnect an MOV and prevent it from reaching a point of catastrophic failure. The TPMOV® device is intended to obviate any need for a series connected fuse or breaker.

The TPMOV® device remains vulnerable, however, to failure modes that can still result in damage. Specifically, if the MOV fails rapidly in an extreme overvoltage event, short circuit conditions may result before the thermal protection features can operate, and severe arcing conditions and potential catastrophic failure may result. Additionally, the construction of the TPMOV® device is somewhat complicated, and relies upon a movable arc shield to disconnect the MOV, and also an electrical microswitch to implement. The presence of the arc shield adds to the overall dimensions of the device. More compact and lower cost options are desired.

Also, the TPMOV® device and other devices presently available include epoxy potted or encapsulated MOV discs. While such encapsulated MOVs can be effective, they tend to entail additional manufacturing steps and cost that would preferably be avoided.

Exemplary embodiments of compact transient voltage surge protection devices are described hereinbelow that overcome the disadvantages discussed above. Smaller, cheaper, and more effective devices are provided with a unique varistor assembly and distinct first and second disconnect modes of operation as explained below to reliably protect the varistor from failing in a full variety of over-voltage conditions.

Turning now to the drawings, FIG. 1 is a perspective view of an exemplary surge suppression device 100 including a generally thin and rectangular, box-like housing 102. Accordingly, the housing 102 in the example shown includes opposing main faces or sides 104 and 106, upper and lower faces or sides 108 and 110, interconnecting adjoining edges of the sides 104 and 106, and lateral sides 112 and 114 interconnecting adjoining edges of the sides 104 and 106 and adjoining edges of the upper and lower sides 108, 110. All of the sides 104, 106, 108, 110 and 114 are generally flat and planar, and extend generally parallel with the respective opposing sides to form a generally orthogonal housing 102. In other embodiments, the sides of the housing 102 need not be flat and planar, nor arranged orthogonally. Various geometric shapes 102 of the housing are possible.

Additionally, in the depicted embodiment, the housing main face 106 may sometimes referred to as a front face of the device 100 and is a substantially solid face without openings or apertures extending therein or therethrough, while the housing main face 104 (also shown in FIG. 2) may be referred to as a rear face. The rear face 104, unlike the front face 106, extends only on the periphery of the device 100 adjacent the sides 108, 112 and 114. That is, the rear face 104 in the exemplary embodiment shown is a frame-like element having a large central opening exposing components of the device 100 on the rear side. As such, the front side 106 entirely covers and protects the internal components of the device 100 on the front side of the device 100, while the rear side 104 generally exposes components of the device 100 on the rear side. Other arrangements of the housing 102 are possible, however, and may be used in other embodiments to provide varying degrees of enclosure for the front and rear sides of the device 100.

The housing 102 has a compact profile or thickness T that is less than known surge suppression devices such as the TPMOV® device described above. Additionally, the outer peripheries of the housing main sides 104 and 106 are approximately square, and the sides 108, 110, 112 and 114 are elongated and rectangular, although other proportions of the housing 102 are possible in other embodiments.

The upper side 108 of the housing 102 is formed with a generally elongated opening 116 through which a portion of a thermal disconnect element, described below, may project to visually indicate a state of the device 100. The lower side 110 of the housing 102 likewise includes an opening (not shown) in which an indicating tab 204 projects, also to provide visual indication of a state of the device.

The housing 102 may be formed from an insulating or electrically nonconductive material such as plastic, according to known techniques such as molding. Other nonconductive materials and techniques are possible, however, to fabricate the housing 102 in further and/or alternative embodiments. Additionally, the housing 102 may be formed and assembled from two or more pieces collectively defining an enclosure for at least the front side of the varistor assembly described below.

Blade terminals 120 and 122 extend from the lower side 110 of the housing 102 in the embodiment shown. The blade terminals 120 and 122 are generally planer conductive elements having chamfered leading edges and apertures therethrough. Further, the blade terminals 120 and 122 are offset from one another in spaced apart, but generally parallel planes. The first terminal 120 is closer to the rear side 104 and extends in a parallel plane to the rear side 104, while the terminal 122 is closer to the front side 106 and extends in a parallel plane to the front side 106. Other arrangements of the terminals are possible in other embodiments, and it is recognized that the blade terminals shown are not necessarily required. That is terminals other than blade-type terminals could likewise be provided if desired to establish electrical connections to circuitry as briefly described below.

The blade terminals 122 and 120 may respectively connect with a power line 124 and a ground line, ground plane or neutral line designated at 128, with plug-in connection to a circuit board or another device connected to the circuitry. A varistor element, described below, is connected in the device 100 between the terminals 120 and 122. The varistor element provides a low impedance path to ground in the event of an over-voltage condition in the power line 124. The low impedance path to ground effectively directs otherwise potentially damaging current away from and around downstream circuitry connected to the power line 124. In normal operating conditions, the varistor provides a high impedance path such that the varistor effectively draws no current and does not affect the voltage of the power line 124. The varistor may switch between the high and low impedance modes to regulate the voltage on the power line 124, either standing alone or in combination with other devices 100. Additionally, and as explained below, the varistor may be disconnected from the power line 124 in at least two distinct modes of operation, in response to different operating over-voltage conditions in the power line 124, to ensure that the varistor will not fail catastrophically. Once disconnected, the device 100 must be removed and replaced.

Figure 2:
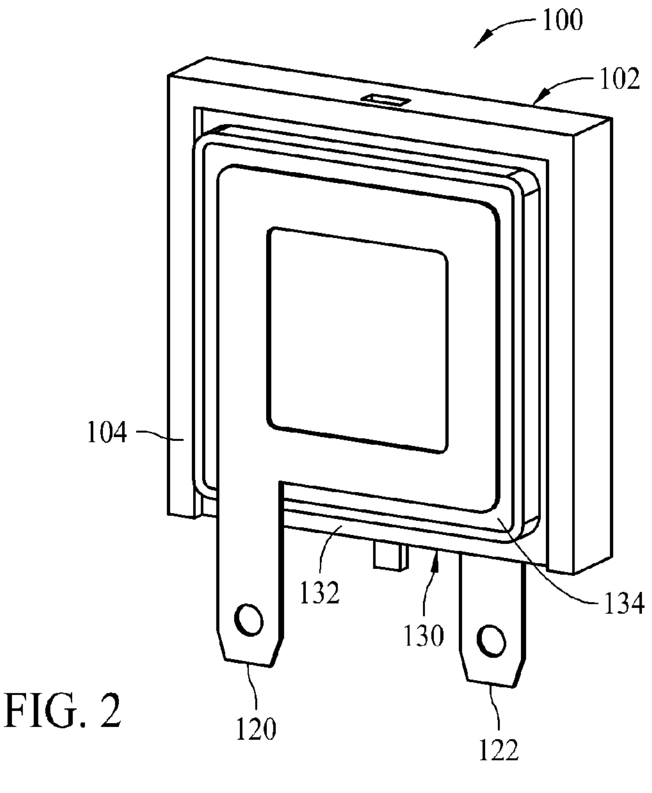
FIG. 2 is a rear perspective view of the device shown in FIG. 1.

FIG. 2 is a rear perspective view of the device 100 shown wherein a rear side of a varistor assembly 130 is exposed. The varistor assembly 130 includes an insulative base plate 132 and a varistor element 134. The terminals 120, 122 are shown on opposing sides of the varistor assembly 130. The voltage potential of the power line 124 is placed across the terminals 120, 122 and, in turn, across the varistor element 134.

Figure 3:
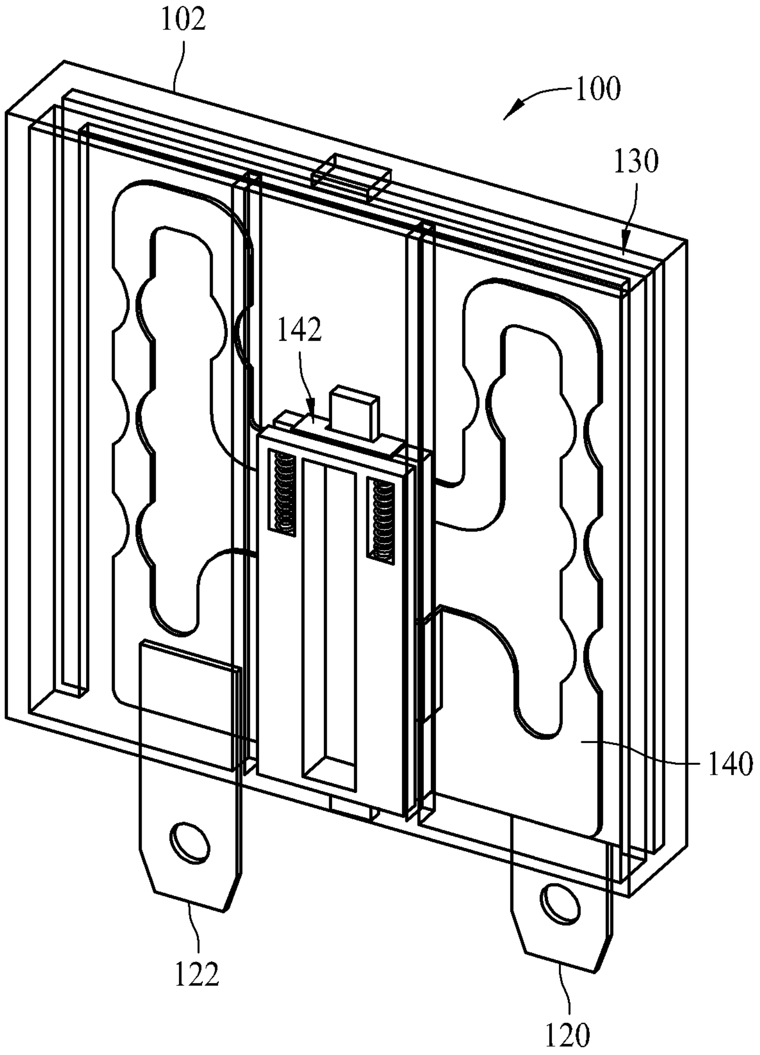
FIG. 3 is a partial front perspective view of the device shown in FIGS. 1 and 2.

FIG. 3 is a partial front perspective view of the device 100 including the varistor assembly 130, a short circuit disconnect element 140, and a thermal disconnect element 142 each providing a different mode of disconnecting the varistor 134. The short circuit disconnect element 140 and the thermal disconnect element 142 are each located opposite the varistor 134 on the other side of the insulative base plate 132. The terminal 122 is connected to the short circuit current element 122, and the terminal 120 is connected to the varistor 134.

Optionally, and as shown in FIG. 3, one or more of the sides of the housing 102 may be wholly or partially transparent such that one or more of the varistor assembly 130, the short circuit disconnect element 140 and the thermal disconnect element 142 may be seen through the housing 102. Alternatively, windows may be provided in the housing to reveal selected portions of the varistor assembly 130, the short circuit disconnect element 140 and the thermal disconnect element 142.

Figure 4:
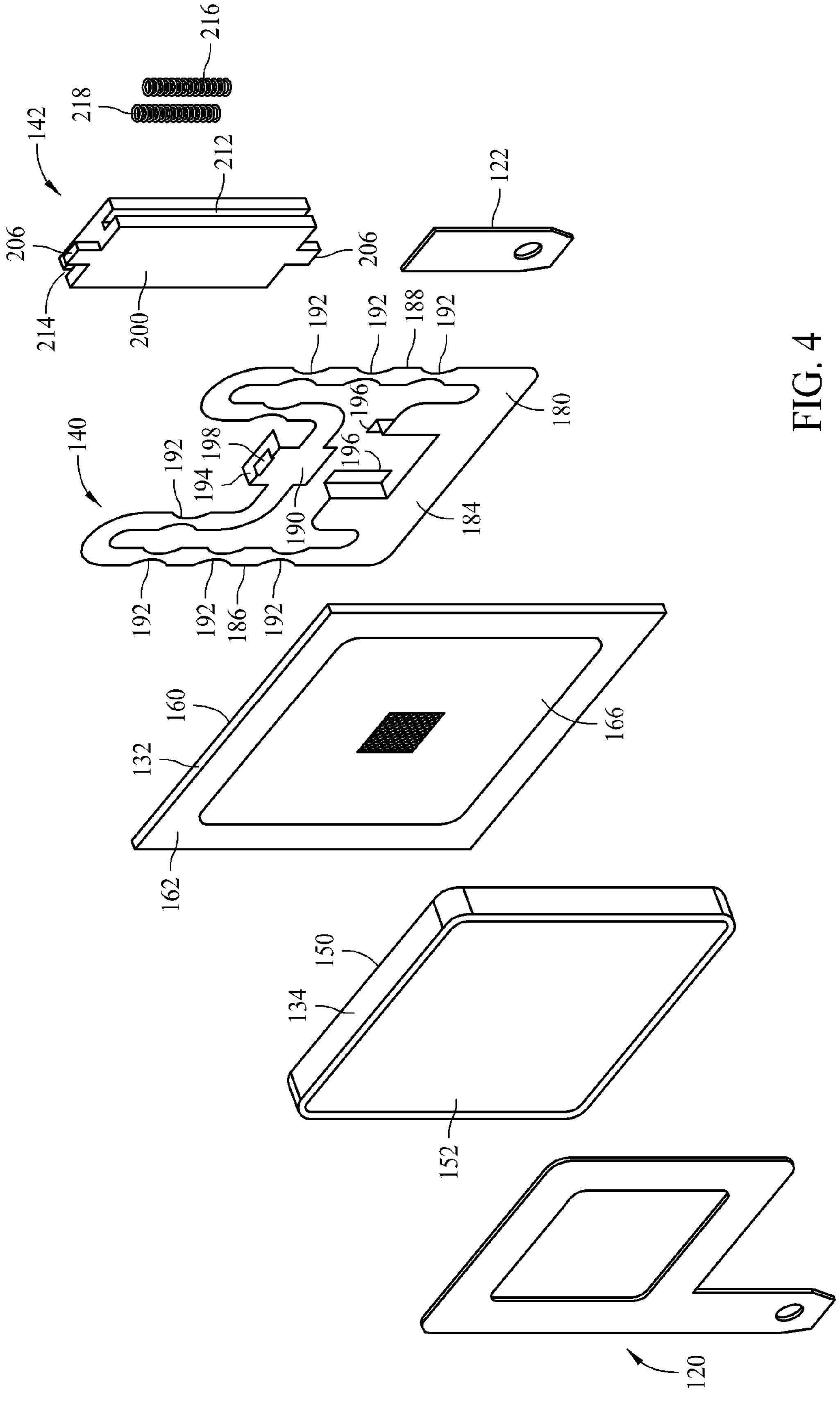
FIG. 4 is an exploded view of the device shown in FIGS. 1-3.
Figure 7:
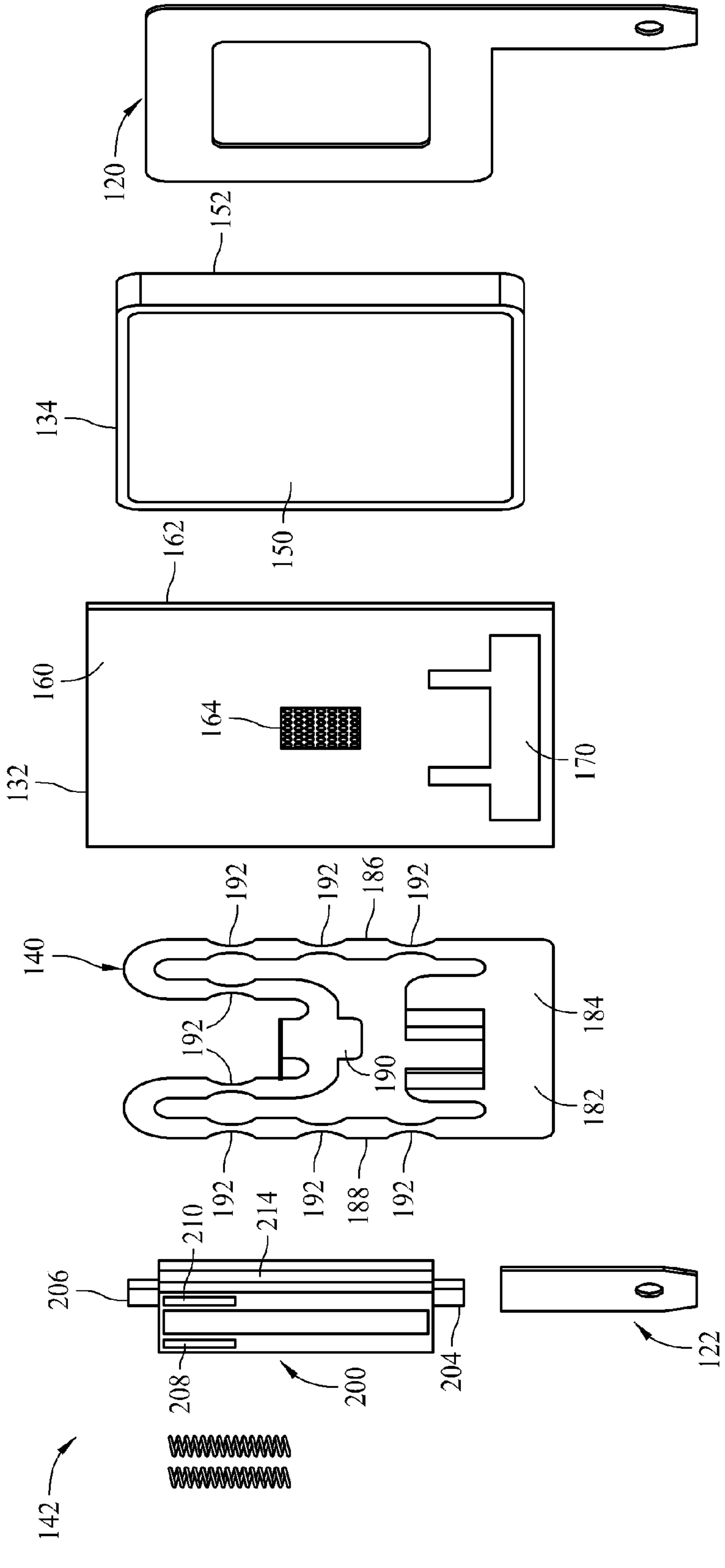
FIG. 7 is a another exploded view of the device shown in FIGS. 1-3.

FIG. 4 is a rear exploded view of the device 100 including, from left to right, the terminal 120, the varistor 134, the insulative base plate 132, the short circuit element 140, the thermal disconnect element 142, and the terminal 122. FIG. 7 shows the same components in exploded front view, the reverse of FIG. 4. The housing 102 is not shown in FIGS. 4 and 7, but it is understood that the components shown in FIGS. 4 and 7 are generally contained in the housing 102 or exposed through the housing 102 as shown in FIGS. 1 and 2 in the illustrative embodiment depicted.

The varistor 134 is a non-linear varistor element such a metal oxide varistor (MOV). As the MOV is a well understood varistor element it will not described in detail herein, except to note that it is formed in a generally rectangular configuration having opposed and generally parallel faces or sides 150 and 152 and slightly rounded corners. The varistor 134 has a generally constant thickness and is solid throughout (i.e., does not include any voids or openings). As those in the art understand, the MOV is responsive to applied voltage to switch from a high impedance state or mode to a low impedance state or mode. The varistor switches state and dissipates heat in an over-voltage condition, wherein the voltage placed across the terminals 120 and 122 exceeds a clamping voltage for the varistor, causing the Varistor to become conductive to divert current to electrical ground.

Unlike conventional surge suppression devices such as those discussed above, the varistor 134 need not be an epoxy potted or otherwise encapsulated varistor element due to the construction and assembly of the device 100 that obviates any need for such encapsulation. Manufacturing steps and cost associated with encapsulating the varistor 134 are accordingly avoided.

The terminal 120 is formed as a generally planar conductive member that is surface mounted to the side 152 of the varistor element 134. The terminal 120 may be fabricated form a sheet of conductive metal or metal alloy according to known techniques, and as shown in the illustrated embodiment includes a generally square upper section that is complementary in shape to the profile of the varistor element 134, and a contact blade extending therefrom as shown in the Figures. The square upper section of the terminal 120 is soldered to side 152 of the varistor using a high temperature solder known in the art. The square upper section of the terminal 120 provides a large contact area with the varistor 134. In other embodiments, the terminal 120 could have numerous other shapes as desired, and the contact blade could be separately provided instead of integrally formed as shown.

The side 150 of the varistor element 134, opposite to the side 152 including the surface mounted terminal 120, is surface mounted to the base plate 132 as described next.

Figure 5:
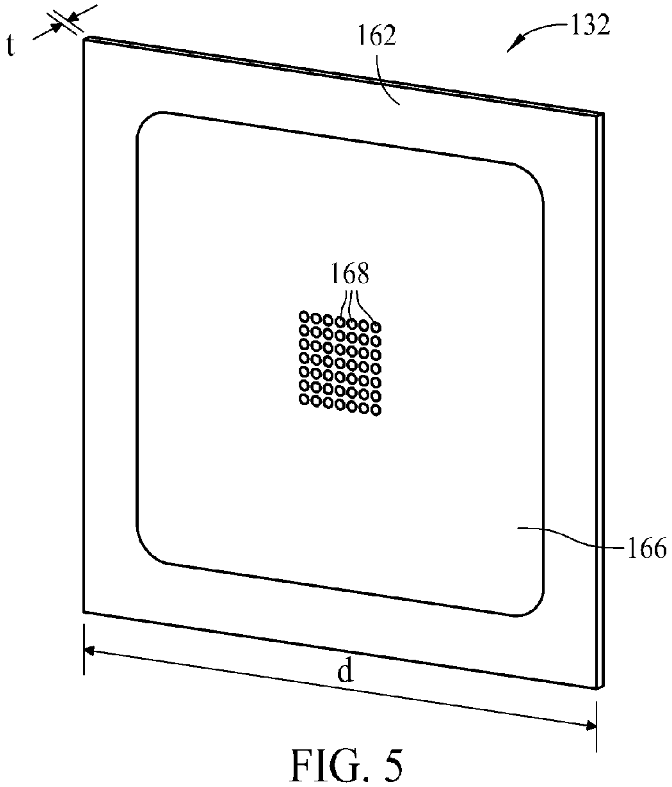
FIG. 5 is a front elevational view of a portion of a varistor sub-assembly for the device shown in FIGS. 1-4.
Figure 6:
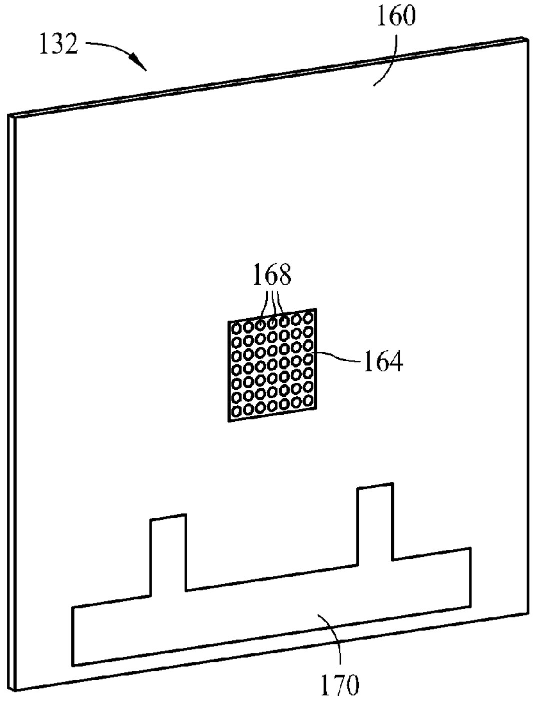
FIG. 6 is a rear elevational view of the portion of the varistor sub-assembly shown in FIG. 5.

The base plate 132, also shown in FIGS. 5 and 6 in rear view and front view, respectively, is a thin element formed from an electrically nonconductive or insulative material into a generally square shape and having opposed faces or sides 160 and 162. In one embodiment, the plate 132 may be fabricated from a ceramic material, and more specifically from alumina ceramic to provide a sound structural base for the varistor element 134 as well as capably withstanding electrical arcing as the device 100 operates as further explained below. Other insulating materials are, of course, known and may be utilized to fabricate the plate 132 in other embodiments.

On the side 160 (shown in FIGS. 5 and 6), the plate 132 is provided with a centrally located and square shaped planar contact 164, which may be formed from conductive material in a plating process or another technique known in the art. On the opposing side 162, the plate 132 is provided with a centrally located and square shaped planar contact 166, which likewise may be formed from conductive material in a plating process or another technique known in the art. Each of the contacts 164, 166 defines a contact area on the respective side 160, 162 of the plate 132, and as shown in the exemplary embodiment illustrated the contact 166 forms a much larger contact area on the side 162 than the corresponding contact area for the contact 164 on the side 160. While square contact areas of different proportion are shown, the contacts 164, 166 need not necessarily be square in other embodiments and other geometric shapes of the contacts 164 may suffice. Likewise, different proportions of the contact areas is not necessarily required and may be considered optional in some embodiments.

As best shown in FIGS. 5 and 6, the insulative plate 132 is further provided with through holes extending completely through the thickness of the plate 132. The through holes may be plated or otherwise filled with a conductive material to form conductive vias 168 interconnecting the contacts 164 and 166 on the respective sides 160 and 162. As such, conductive paths are provided extending from one side 160 of the plate 132 to the other side 162 by virtue of the contacts 164, 166 and the vias 168.

As shown in FIG. 5, the lateral sides of the plate 132 in an exemplary embodiment share a dimension d of about 38 mm, and the plate has a thickness t of about 0.75 to 1.0 mm in the example shown. Other dimensions are, of course, possible and may be adopted.

As shown in FIG. 6, the side 160 of the plate 162 includes, in addition to the contact 164, an anchor element 170 for the short circuit element 140. The anchor element 170 may be a plated or printed element formed on the surface of the side 160, and may be formed from a conductive material. The anchor element 170 is electrically isolated on the surface of the side 160, and serves mechanical retention purposes only as the short circuit current element 140 is installed. While an exemplary shape for the anchor element 140 is shown, various other shapes are possible.

Figure 8:
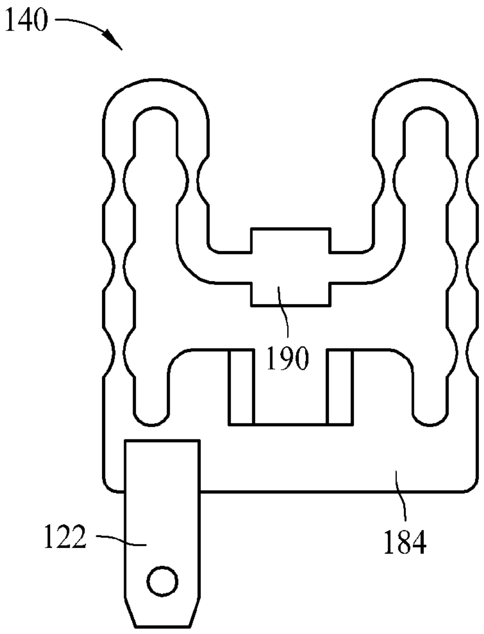
FIG. 8 is a front elevational view of an exemplary short circuit disconnect element for the device shown in FIG. 1-3.

As seen in FIGS. 4, 7 and 8, the short circuit disconnect element 140 generally is a planar conductive element including a rear side 180 and a front side 182 opposing one another. More specifically, the short circuit disconnect element 140 is formed to include an anchor section 184 lateral conductors 186 and 188 extending from the anchor section 184, and a contact section 190 longitudinally spaced from the anchor section 184 but interconnected with the conductors 186, 188. The conductors 186 and 188 extend longitudinally upward from the lateral edges of the anchor section 186 for a distance, turn approximately 180° and extend downwardly toward the anchor portion 184 for another distance, and then turn about 90° to meet and adjoin with the contact section 190. The contact section 190 is formed in the example shown in a square shape having a contact area roughly equal to the contact area for the plate contact 164.

The contact section 190 may be surface mounted to the plate contact 164 using a low temperature solder to form a thermal disconnect junction therebetween, while the anchor section 184 is surface mounted to the plate anchor element 170 using high temperature solder. As a result, the anchor section 184 is effectively mounted and anchored in a fixed position on the side 160 of the plate 132, while the contact section 190 may be moved and detached from the plate contact 164 when the low temperature junction is weakened as further described below.

The conductors 186 and 188 of the short circuit disconnect element 140 are further formed with narrowed sections 192 having a reduced cross sectional area, sometimes referred to as weak spots. When exposed to a short circuit current condition, the weak spots 192 will melt and disintegrate such that the conductors 186 and 188 no longer conduct current, and hence disconnect the varistor element 134 from the power line 124 (FIG. 1). The length of the conductors 186 and 188, which is lengthened by the 180° turns, and also the number and areas of the weak spots, determine a short circuit rating for the conductors 186, 188. The short circuit rating can therefore be varied with different configurations of the conductors 186, 188.

The short circuit disconnect element 140 also includes, as best shown in FIG. 4, a retainer section 194 and rail sections 196 extending out of the plane of the anchor section 184, the conductors 186, 188 and the contact section 190. The retainer section 194 includes an aperture 198 that cooperates with the thermal disconnect element 142 as described below, and the rails 196 serve as mounting and guidance features for movement of the thermal disconnect element 142.

The terminal 122 is shown as a separately provided element from the short circuit disconnect element 140 in the illustrated examples. The terminal 122 is welded to the anchor section 184 in an exemplary embodiment. In another embodiment, however, the terminal 122 could be integrally provided with or otherwise attached to the anchor section 184.

The thermal disconnect element 142 includes, as shown in FIGS. 4 and 7, a nonconductive body 200 fabricated from molded plastic, for example. The body 200 is formed with oppositely extending indication tabs 204 and 206, bias element pockets 208 and 210, and elongated slots 212 and 214 extending longitudinally on the lateral sides thereof. The slots 212 and 214 receive the rails 196 (FIG. 4) when the thermal disconnect element 142 is installed, and the pockets 208 and 210 receive bias elements 216 and 218 in the form of helical compression springs.

The indication tab 206 is inserted through the aperture 198 (FIG. 4) in the retainer section 194 of the short circuit disconnect element 140, and the springs 216, 218 seat on the upper edges of the rails 196, (as further shown in FIG. 14) and provide an upwardly directed bias force against the retainer section 194. In normal operation, and because the contact section 190 is soldered to the plate contact 164 (FIG. 7), the bias force is insufficient to overcome the soldered junction and the contact section 190 is in static equilibrium and remains in place. When the soldered junction is weakened, however, such as in a low to moderate but sustained overvoltage condition, the bias force acting on the retainer section 194 overcomes the weakened soldered junction and causes the contact section 190 to be moved away from the plate contact 164.

FIG. 8 is a front assembly view of a manufacturing step for the device 100 wherein the terminal 122 is welded to the anchor section 184 of the short circuit disconnect element 140. Secure mechanical and electrical connection between the short circuit disconnect element 140 and the terminal 122 is therefore assured.

Figure 9:
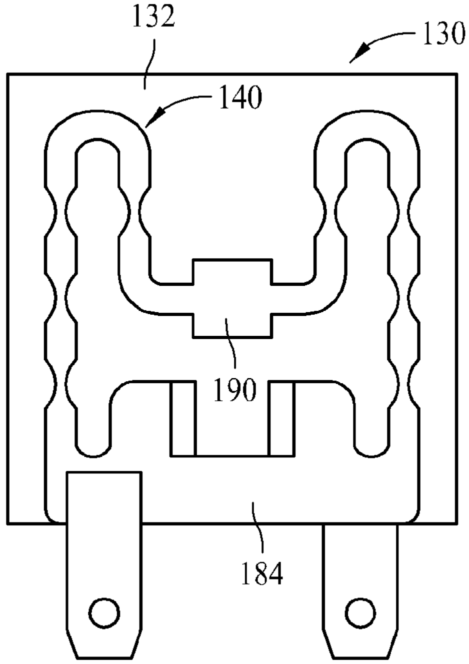
FIG. 9 is a front elevational view of a soldered assembly including the short circuit disconnect element of FIG. 8.

FIG. 9 shows the short circuit disconnect element 140 mounted to the varistor assembly 130. Specifically, the contact section 190 is surface mounted to the plate contact 164 (FIGS. 6 and 7) using a low temperature solder and the anchor section 184 is mounted to the plate anchor element 170 (FIGS. 6 and 7) using high temperature solder.

Figure 10:
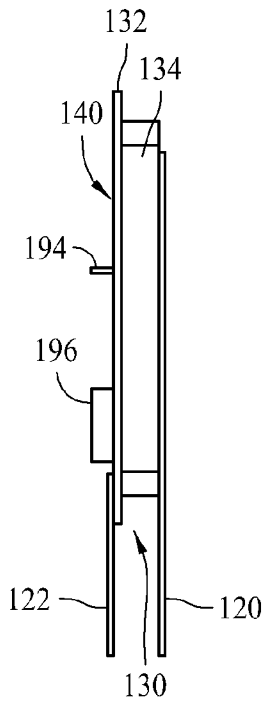
FIG. 10 is a side elevational view of the assembly shown in FIG. 9.
Figure 11:
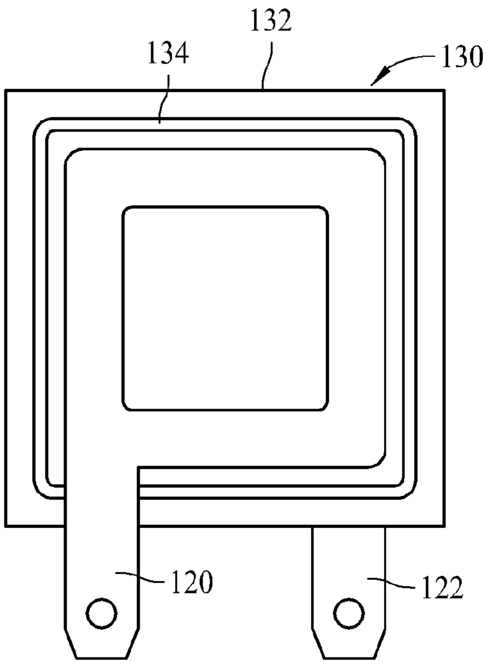
FIG. 11 is a rear elevational view of the assembly shown in FIGS. 9.

FIGS. 10 and 11 also show the terminal 120 surface mounted to the varistor element 134 using a high temperature solder. As best shown in FIG. 10, the varistor 134 is sandwiched between the terminal 120 and one side of the plate 132, and the plate 132 is sandwiched between the varistor 134 and the short circuit disconnect element 140. Because of the direct, surface mount engagement of the components, a compact assembly results, giving the device 100 a considerably reduced thickness T (FIG. 1) in comparison to known surge suppression devices.

Figure 12:
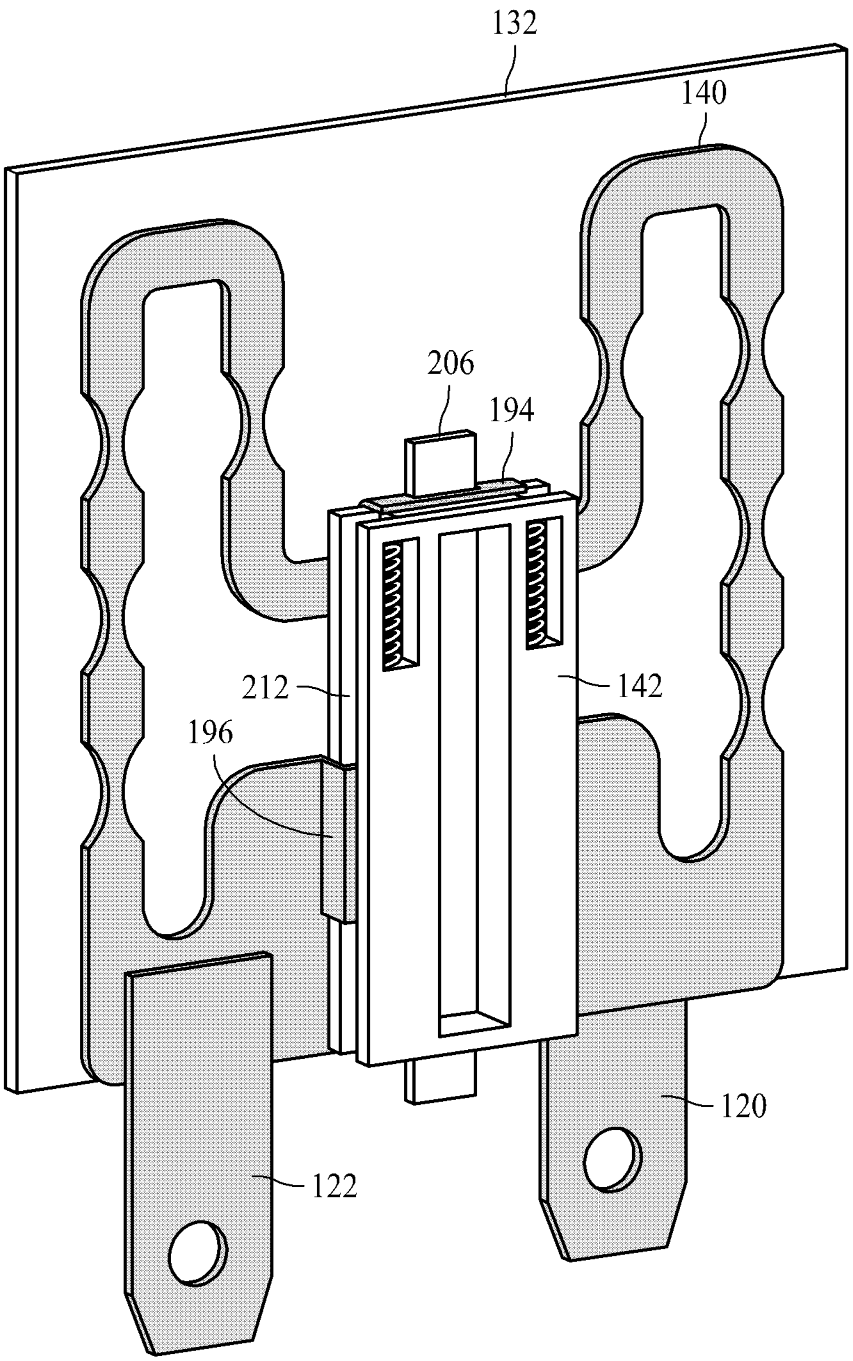
FIG. 12 is a front perspective assembly view of a portion of assembly shown in FIG. 9 with a thermal disconnect element.
Figure 13:
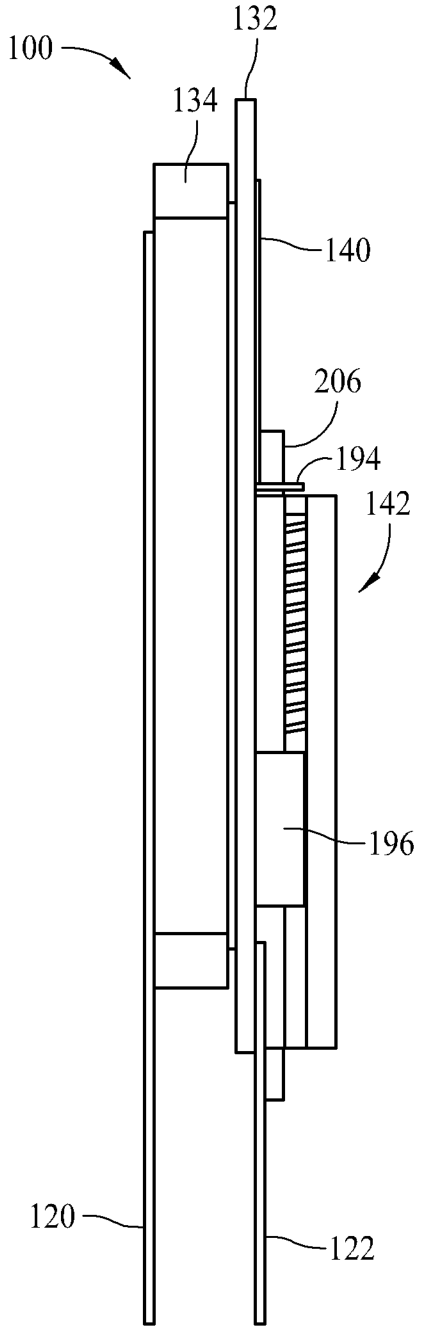
FIG. 13 is a side elevational view of the assembly shown in FIG. 12.

FIGS. 12 and 13 show the thermal disconnect element 142 installed to the assembly shown in FIG. 9. The tab 206 is inserted through the retainer section 194 of the short circuit disconnect element 140, and the slots 212, 214 are received on the rails 196 (also shown in FIG. 4). The bias elements 216, 218 (FIG. 4) are compressed by the disconnect element 142 when installed.

Figure 14:
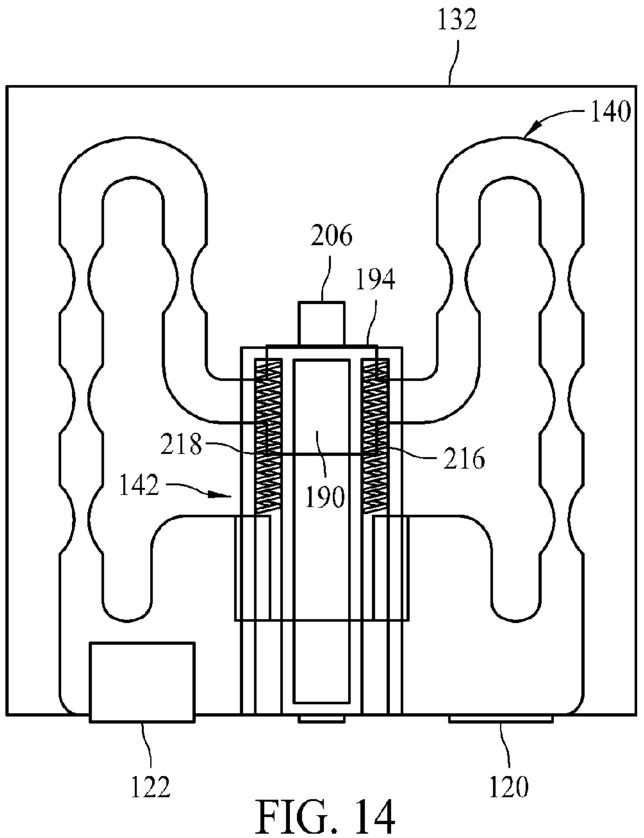
FIG. 14 illustrates the device including the short circuit current element and the thermal disconnect element in normal operation.

FIG. 14 illustrates the device 100 with the short circuit current element 140 and the thermal disconnect 140 element in normal operation. The bias elements 216 and 218 of the thermal disconnect element 140 provide an upwardly directed bias force (indicated by Arrow F in FIG. 15). In normal operation, however, the bias force F is insufficient to dislodge the soldered junction of the contact section 190 of the short circuit disconnect element 140 to the plate contact 164 (FIGS. 6 and 7).

Figure 15:
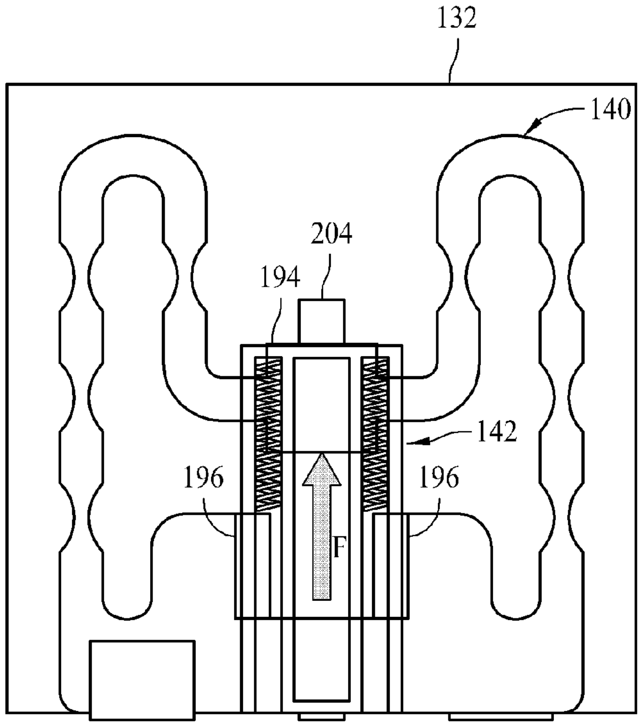
FIGS. 15 and 16 illustrate a first disconnection mode of the device wherein the thermal disconnect element operates to disconnect the varistor.
Figure 16:
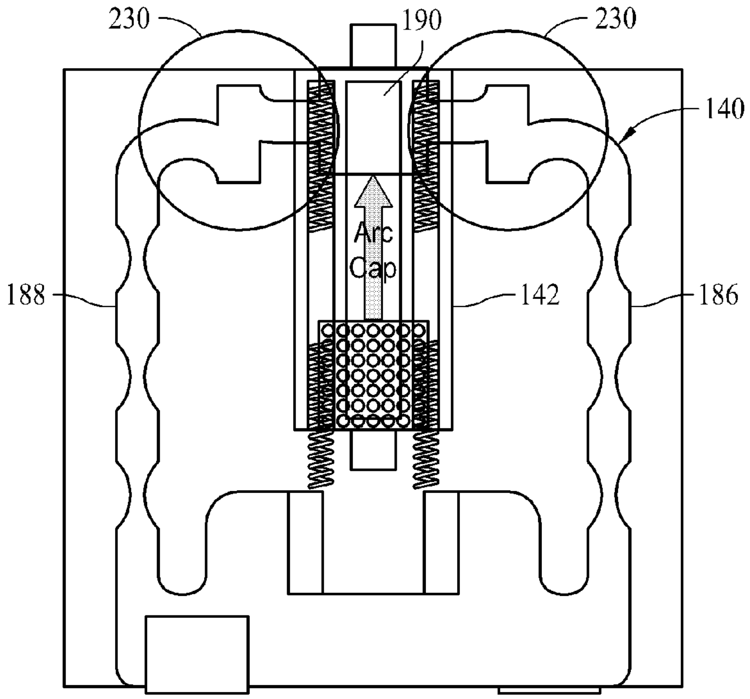

FIGS. 15 and 16 illustrate a first disconnection mode of the device wherein the thermal disconnection operates to disconnect the varistor 134.

As shown in FIGS. 15 and 16, as the soldered junctions weakens when the varistor element heats and becomes conductive in an over-voltage condition, the bias force F counteracts the weakened soldered junction to the point of release, wherein as shown in FIG. 16 the bias elements cause the thermal disconnect element 142 to become displaced and moved axially in a linear direction upon the rails 196. Because the tab 206 of the thermal disconnect element 142 is coupled to the retainer section 194 of the short circuit current element 140, as the thermal disconnect element 142 moves so does the retainer 190, which pulls and detaches the contact section 190 from the plate contact 164. The electrical connection through the plate 132 is therefore severed, and the varistor 134 becomes disconnected from the terminal 122 and the power line 124 (FIG. 1).

As the contact section 190 is moved, an arc gap is created between the original soldered position of the contact section 190 and its displaced position shown in FIG. 16. Any electrical arcing that may occur is safely contained in the gap between the insulating plate 132 and the thermal disconnect element 142, and is mechanically and electrically isolated from the varistor element 134 on the opposing side of the insulating plate 132.

The bias elements generate sufficient force on the thermal disconnect element 142 once it is released to cause the conductors 186, 188 to fold, bend or otherwise deform proximate the contact section 190, as indicated in the regions 230 in FIG. 16, as the thermal disconnect 142 moves. Because the conductors 186, 188 are formed as thin, flexible ribbons of conductive material (having an exemplary thickness of 0.004 inches or less), they deform rather easily once the thermal disconnect element 142 begins to move. As shown in FIG. 16, the thermal disconnect element 142 may be moved upwardly along a linear axis until the indicating tab 206 projects through the upper side 108 of the housing 102 (FIG. 1) to provide visual indication that the device 100 has operated and needs replacement.

Figure 17:
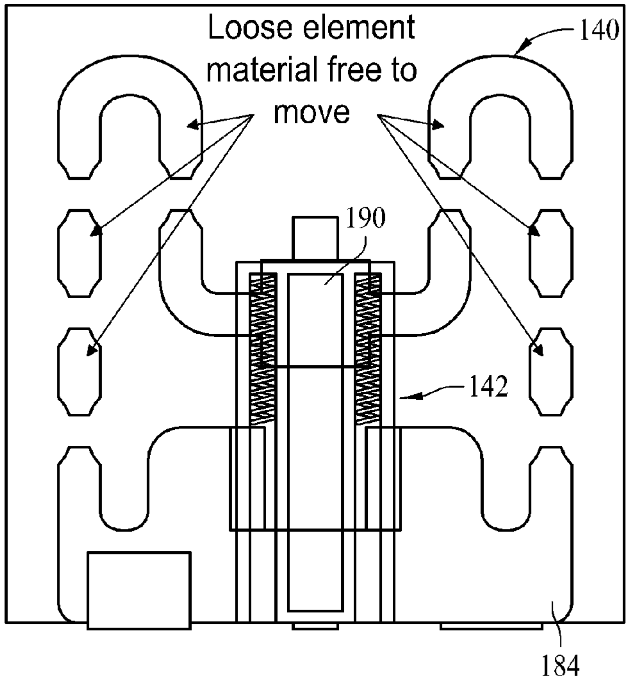
FIG. 17 illustrates a second disconnection mode of the device wherein the short circuit disconnect element has operated to disconnect the varistor.

FIG. 17 illustrates a second disconnection mode of the device 100 wherein the short circuit disconnect element 140 has operated to disconnect the varistor 134 from the terminal 122 and the power line 124 (FIG. 1). As seen in FIG. 17, the conductors 186 and 188 have disintegrated at the weak spots 192 (FIGS. 4 and 7) and can no longer conduct current between the anchor section 184 and the contact section 190 of the short circuit disconnect element 140. Electrical contact with the plate contact 164 and the conductive vias 168 to the other side of the plate 132 where the varistor element 134 resides is therefore broken, and the varistor 134 accordingly is no longer connected to the terminal 122 and the power line 124. The short circuit disconnect element 140 will operate in such a manner in extreme over-voltage events in much less time than the thermal disconnect element 140 would otherwise require. Rapid failure of the varistor element 134 before the thermal protection element 142 has time to act, and also resultant short circuit conditions, are therefore avoided.

Figure 18:
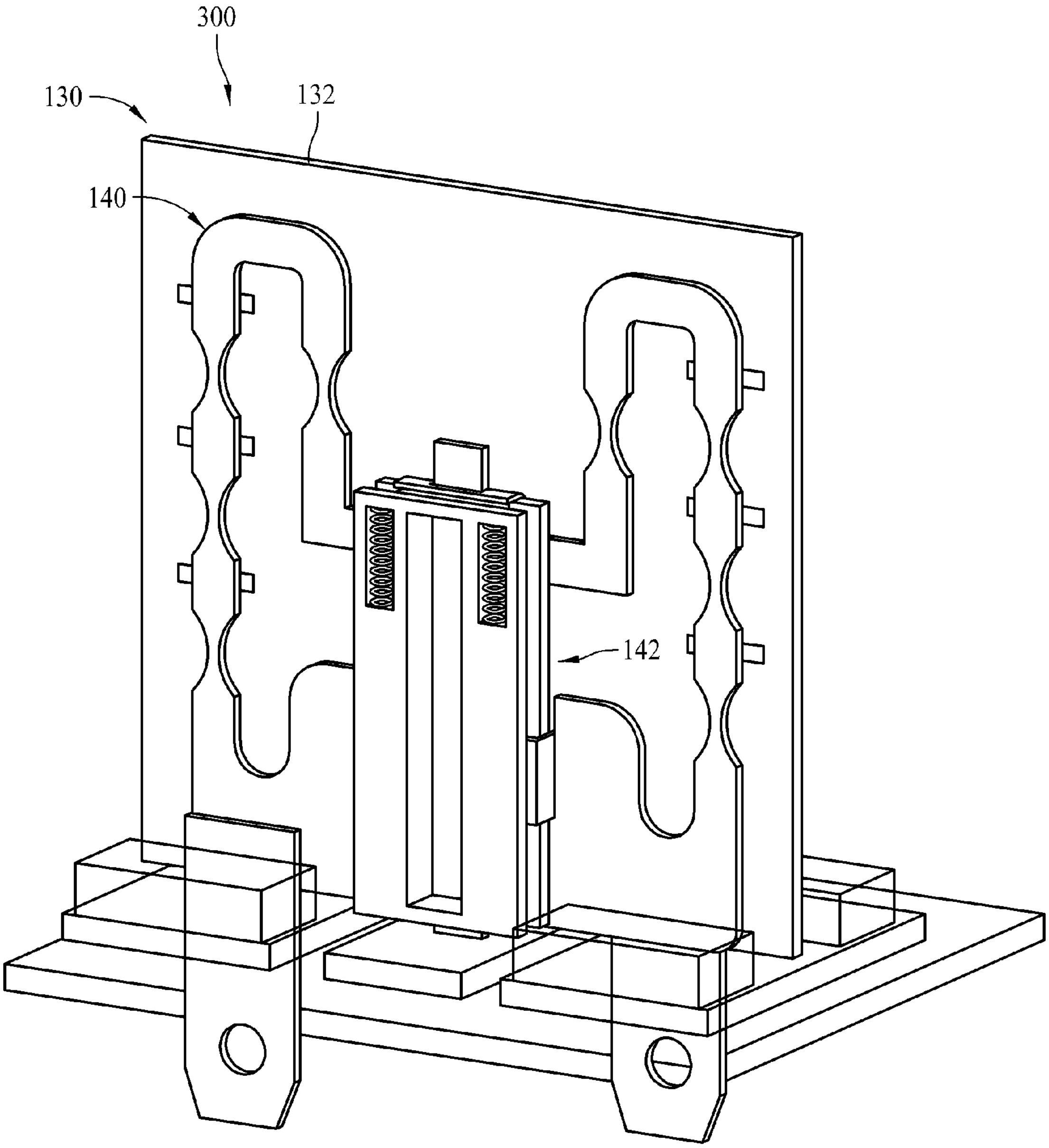
FIG. 18 is a partial front perspective view of another exemplary surge suppression device in normal operation.
Figure 19:
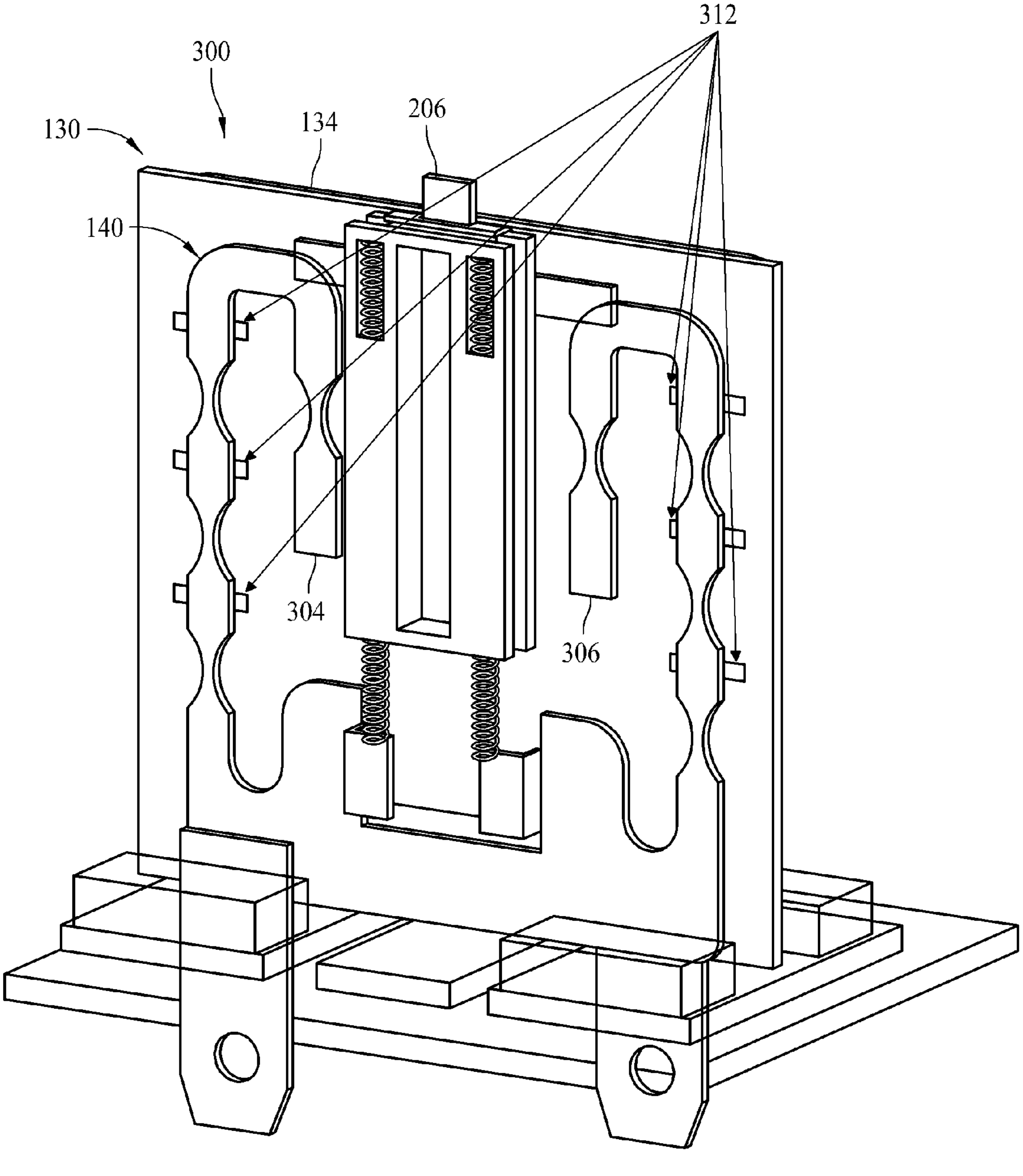
FIG. 19 is a similar view to FIG. 18 but showing the thermal disconnect element has operated to disconnect the varistor.
Figure 20:
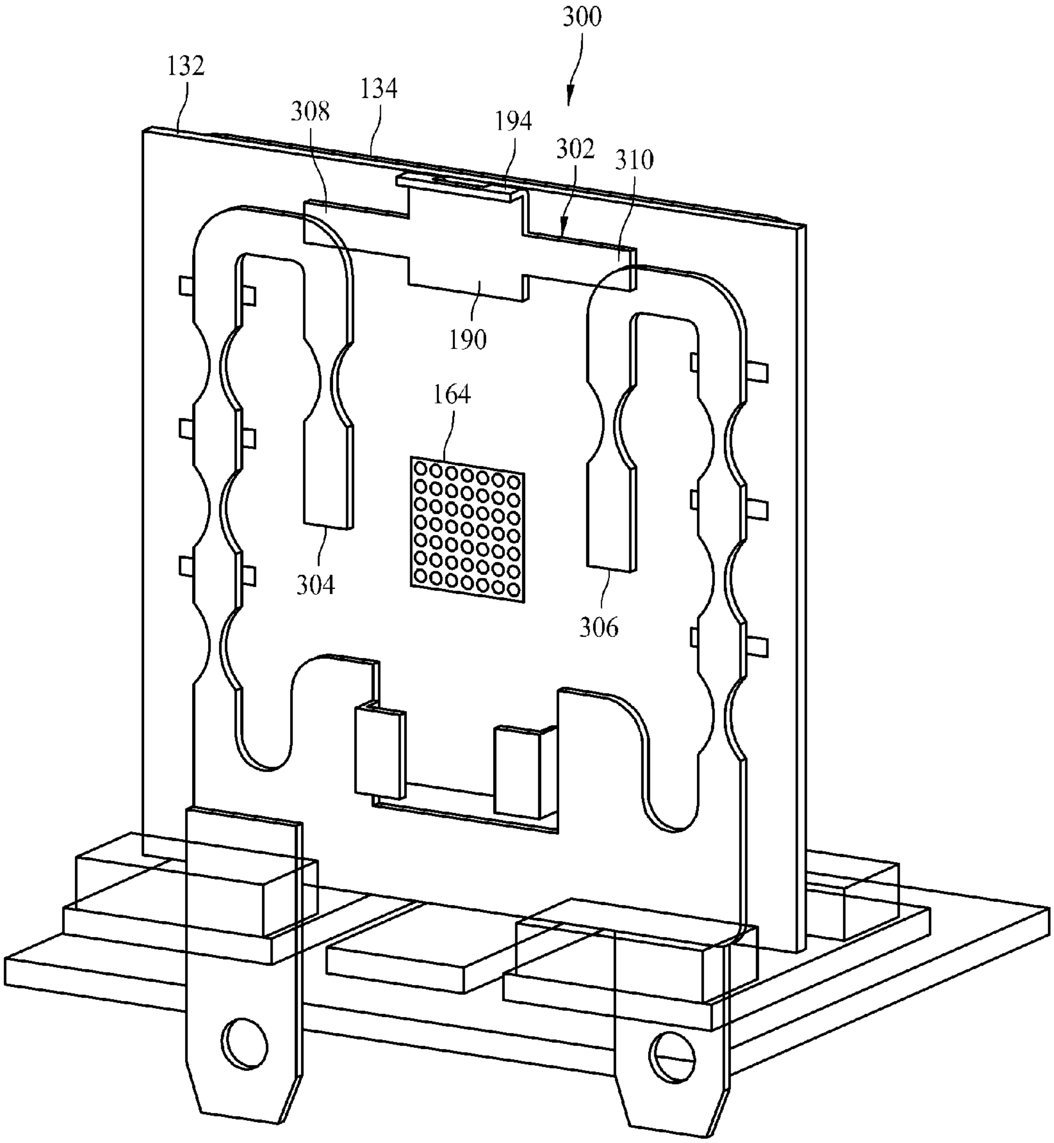
FIG. 20 is a view similar to FIG. 19 with the thermal disconnect element not shown.

FIGS. 18-20 illustrate another exemplary embodiment of a surge suppression device 300 that is similar in many aspects to the device 100 described above. Common features of the devices 300 and 100 are therefore indicated with like reference characters in FIGS. 18-20. As the common features are described in detail above, no further discussion therefore is believed to be necessary.

Unlike the device 100, the varistor assembly 130 is further provided with a separable contact bridge 302 (best shown in FIG. 20) that is carried by the thermal disconnect element 142. Opposing ends 308, 310 of the contact bridge 302 are respectively soldered to distal ends 304, 306 of the short circuit element 140 with low temperature solder. The contact section 190 of the bridge 302 is likewise soldered to the contact 164 (FIG. 7) of the base plate 132 with low temperature solder.

In normal operation of the device 300, as shown in FIG. 18, the low temperature solder joints connecting the ends 308, 310 and the contact section of the bridge 302 are sufficiently strong to withstand the flow of electrical current through the device 100 as discussed above.

As the low temperature solder junctions are weakened when the varistor element heats and becomes conductive in an over-voltage condition, the bias force F counteracts the weakened soldered junctions to the point of release, and the ends 308, 310 and contact section 190 of the bridge 302 separate from the ends 304, 306 of the short circuit element 140 and the contact 164 of the base plate 132. As this occurs, and as shown in FIGS. 19 and 20, the bias elements of the thermal disconnect element 142 cause the thermal disconnect element 142 to become displaced and moved axially in a linear direction. Because the tab 206 (FIG. 19) of the thermal disconnect element 142 is coupled to the retainer section 194 (FIG. 20) of the contact bridge 302, as the thermal disconnect element 142 moves so does the contact bridge 302. The electrical connection through the plate 132 via the contact 164 is therefore severed, and the varistor 134 accordingly becomes disconnected from the terminal 122 and the power line 124 (FIG. 1). Likewise, the electrical connection between the ends 308, 310 of the contact bridge 302 and the ends 304, 306 of the short circuit element 140 are severed. This result is sometimes referred to as a "triple break" feature wherein three points of contact are broken via three different low temperature solder joints. The triple break action provides capability of the device 300 to perform with higher system voltages than the device 100.

Short circuit operation of the device 300 is substantially similar to the device 100 described above. The device 300 includes, however, solder anchors 312 in the varistor assembly 130 that allow the short circuit element 140 to withstand, for example, high energy impulse currents without deforming or otherwise compromising operation of the device 300. Such high energy impulse currents may result from testing procedures or from current surges that are otherwise not problematic to an electrical system and are not of concern for purposes of the device 300. The solder anchors 312 bond the short circuit current element 140 to the base plate 132 without creating electrical connections. The solder anchors 312 as shown may be located between adjacent weak spots in the short circuit current element, or at other locations as desired.

The benefits and advantages of the invention are now believed to be evident from the exemplary embodiments described.

An embodiment of a transient voltage surge suppression device has been disclosed including: a nonconductive housing; and a varistor assembly. The varistor assembly includes: an insulating base plate mounted stationary in the housing, the insulating plate having opposed first and second sides; and a varistor element having opposed first and second sides, one of the opposing first and second sides of the varistor being surface mounted to one of the opposing sides of the plate, and the varistor element operable in a high impedance mode and a low impedance mode in response to an applied voltage.

Optionally, the varistor element may be substantially rectangular. The varistor element may be a metal oxide varistor, and the insulative base plate may be a ceramic plate. The ceramic plate may comprise alumina ceramic. The insulative base plate may further include a plurality of conductive vias extending between the opposing sides. The insulative base plate may also include a first conductive contact provided on the first side and a second conductive conduct provided on the second side, with the first and second conductive contacts electrically interconnected by the plurality of conductive vias. The first conductive contact may establish electrical connection to one of the first and second sides of the varistor element. The device may also include a first terminal connected to the other of the first and second sides of the varistor element, and a second terminal connected to the second conductive contact. The first and second terminals may include blade terminals projecting from a common side of the housing.

Each of the first and second conductive contacts on the base plate may be substantially planar. The first conductive contact may define a first contact area and the second electrical contact may define a second contact area, with the first contact area being larger than the second contact area.

The device may further include a short circuit disconnect element, with a portion of the short circuit disconnect element surface mounted to the second conductive contact of the base plate. The short circuit disconnect element may include a flexible conductor formed with a plurality of weak spots. A first terminal may be mounted to and extend from the short circuit disconnect element, and the first terminal may include a blade contact projecting from a side of the housing.

The device may also further include a thermal disconnect element coupled to the short circuit disconnect element and causing the short circuit disconnect element to detach from the second conductive contact in a first disconnect mode of operation. The thermal disconnect element may be configured to displace and bend a portion of the short circuit disconnect element in the first disconnect mode of operation. The thermal disconnect element may be spring biased, and may also include a nonconductive body having opposing sides with respective longitudinal slots formed therein. The short circuit disconnect element may be formed with first and second rails, and the first and second rails may be received in the respective first and second longitudinal slots of the thermal disconnect element. A portion of the short circuit disconnect element may be soldered to the first conductive contact with a low temperature solder, and the thermal disconnect element may force the portion of the short circuit disconnect element away from the second contact when the soldered connection is weakened.

The housing of the device may optionally be substantially rectangular, and at least a portion of the housing may be transparent. A short circuit disconnect element may be connected to the varistor element and a thermal disconnect element may be coupled to the short circuit disconnect element. The short circuit disconnect element and the thermal disconnect element may be located on one of the sides of the insulative plate, and the varistor may be located on the other side of the insulative plate. The device may further include a separable contact bridge interconnecting the thermal disconnect element and the short circuit disconnect element. The contact bridge may be separable from the short circuit disconnect element in at least two locations, and the contact bridge may further be connected to the MOV with a low temperature solder joint.

The device may optionally include a first substantially planar terminal attached to a side of the varistor opposite the insulative plate. A second substantially planar terminal may extend on the side of the insulative base plate opposite the varistor element.

The device may optionally include a short circuit disconnect element, with the insulative base plate sandwiched between the varistor and the short circuit disconnect element. A thermal disconnect element may be mounted to the short circuit current element and may be movable along a linear axis. A portion of the thermal disconnect element may be configured to project through a portion of the housing when in a disconnected position, thereby providing visual indication of the thermal disconnect mode of operation.

The insulating base plate may have a thickness of about 0.75 mm to about 1.0 mm. A short circuit disconnect element may also be provided. The short circuit disconnect element may be generally planar and have a thickness of less about 0.004 inches or less. The device may include first and send terminals for connecting the varistor to an electrical circuit, and first and second disconnect elements operable to disconnect the varistor in response to distinct operating conditions in the electrical circuit.

The varistor assembly may include a first side and a second side, with the housing substantially enclosing the first side of the varistor assembly and substantially exposing the second side of the varistor assembly. The varistor element may not be encapsulated.

The varistor assembly may optionally include a short circuit current element formed with a plurality of weak spots, and a plurality of solder anchors bonding the short circuit current element to the insulative base plate. At least some of the plurality of solder anchors may be located between adjacent weak spots in the short circuit current element.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transient voltage surge suppression device comprising:

a nonconductive housing; and a varistor assembly comprising:

an insulating base plate mounted stationary in the housing, the insulating plate having opposed first and second major side surfaces;

a varistor element having opposed first and second major side surfaces, one of the opposed first and second major side surfaces of the varistor element being surface mounted to one of the opposed first and second major side surfaces of the insulating base plate;

wherein the varistor element is operable in a high impedance mode and a low impedance mode in response to an applied voltage;

a short circuit current element formed with a plurality of weak spots; and a plurality of solder anchors bonding the short circuit current element to the insulating base plate.

2. The device of claim 1, wherein the varistor element is substantially rectangular.

3. The device of claim 1, wherein the varistor element is a metal oxide varistor.

4. The device of claim 1, wherein the insulating base plate is a ceramic plate.

5. The device of claim 4, wherein the ceramic plate comprises alumina ceramic.

6. The device of claim 1, wherein the housing is substantially rectangular.

7. The device of claim 1, further comprising a thermal disconnect element coupled to the short circuit disconnect element.

8. The device of claim 1, wherein at least some of the plurality of solder anchors are located between adjacent weak spots in the short circuit current element.

9. A transient voltage surge suppression device comprising:

a nonconductive housing; and a varistor assembly comprising:

an insulating base plate mounted stationary in the housing, the insulating plate having opposed first and second major side surfaces; and a varistor element having opposed first and second major side surfaces, one of the opposed first and second major side surfaces of the varistor element being surface mounted to one of the opposed first and second major side surfaces of the insulating base plate;

wherein the varistor element is operable in a high impedance mode and a low impedance mode in response to an applied voltage; and wherein the insulating base plate further comprises a plurality of conductive vias extending between the opposed first and second major side surfaces.

10. The device of claim 9, wherein the insulating base plate comprises a first conductive contact provided on the first major side surface and a second conductive contact provided on the second major side surface, the first and second conductive contacts electrically interconnected by the plurality of conductive vias.

11. The device of claim 10, wherein the first conductive contact establishes electrical connection to one of the first and second major side surfaces of the varistor element.

12. The device of claim 10, wherein each of the first and second conductive contacts are substantially planar.

13. The device of claim 10, wherein the first conductive contact defines a first contact area and the second electrical contact defines a second contact area, the first contact area being larger than the second contact area.

14. The device of claim 10, further comprising a short circuit disconnect element, a portion of the short circuit disconnect element surface mounted to the second conductive contact.

15. A transient voltage surge suppression device comprising:

a nonconductive housing; and a varistor assembly comprising:

an insulating base plate mounted stationary in the housing, the insulating plate having opposed first and second major side surfaces;

a varistor element having opposed first and second major side surfaces, one of the opposed first and second major side surfaces of the varistor element being surface mounted to one of the opposed first and second major side surfaces of the insulating base plate;

wherein the varistor element is operable in a high impedance mode and a low impedance mode in response to an applied voltage;

a short circuit disconnect element connected to the varistor element; and a thermal disconnect element coupled to the short circuit disconnect element;

wherein the short circuit disconnect element and the thermal disconnect element are located on one of the opposed first and second major side surfaces of the insulating base plate, and the varistor element is located on the other of the first and second major side surfaces of the insulating base plate.

16. The device of claim 15, further comprising a first substantially planar terminal attached to the major side surface of the varistor element opposite the insulating base plate.

17. The device of claim 16, further comprising a second substantially planar terminal extending on the major side surface of the insulating base plate opposite the varistor element.

18. The device of claim 15 wherein at least a portion of the housing is transparent.

19. The device of claim 15, further comprising a separable contact bridge interconnecting the thermal disconnect element and the short circuit disconnect element.

20. The device of claim 19, wherein the contact bridge is separable from the short circuit disconnect element in at least two locations.

21. The device of claim 20, wherein the contact bridge is further connected to the varistor element with a low temperature solder joint.

22. A transient voltage surge suppression device comprising:

a nonconductive housing; and a varistor assembly comprising:

an insulating base plate mounted stationary in the housing, the insulating plate having opposed first and second major side surfaces, a varistor element having opposed first and second major side surfaces, one of the opposed first and second major side surfaces of the varistor element being surface mounted to one of the opposed first and second major side surfaces of the insulating base plate;

wherein the varistor element is operable in a high impedance mode and a low impedance mode in response to an applied voltage; and a short circuit disconnect element, the insulating base plate sandwiched between the varistor element and the short circuit disconnect element.

23. The device of claim 22, wherein the short circuit disconnect element comprises a flexible conductor formed with a plurality of weak spots.

24. The device of claim 23, further comprising a first terminal mounted to and extending from the short circuit disconnect element.

25. The device of claim 24 wherein the first terminal comprises a blade contact projecting from a side of the housing.

26. The device of claim 22, further comprising a thermal disconnect element coupled to the short circuit disconnect element and operable in a first disconnect mode of operation.

27. The device of claim 26, wherein the thermal disconnect element is configured to displace and bend a portion of the short circuit disconnect element in the first disconnect mode of operation.

28. The device of claim 26, wherein the thermal disconnect element is spring biased.

29. The device of claim 26, wherein the thermal disconnect element includes a nonconductive body having opposing sides with respective longitudinal slots formed therein, the short circuit disconnect element being formed with first and second rails, and the first and second rails received in the respective first and second longitudinal slots.

30. The device of claim 26, wherein the insulating base plate is provided with a conductive contact, and wherein a portion of the short circuit disconnect element is soldered to the conductive contact with a low temperature solder, and the thermal disconnect element forces the portion of the short circuit disconnect element away from the conductive contact when the soldered connection is weakened.

31. The device of claim 22, further comprising a thermal disconnect element mounted to the short circuit current element and movable along a linear axis.

32. The device of claim 31, wherein a portion of the thermal disconnect element is configured to project through a portion of the housing when in a disconnected position, thereby providing visual indication of a thermal disconnect mode of operation.

33. The device of claim 22, wherein the insulating base plate has a thickness of about 0.75 mm to about 1.0 mm.

34. The device of claim 22, wherein the short circuit disconnect element is generally planar and has a thickness of less than about 0.004 inches.

35. The device of claim 22, wherein the varistor assembly includes a first side and a second side, the housing substantially enclosing the first side of the varistor assembly and substantially exposing the second side of the varistor assembly.

36. The device of claim 22, wherein the varistor element is not encapsulated.

37. A transient voltage surge suppression device comprising:

a nonconductive housing; and a varistor assembly comprising:

- an insulating base plate mounted stationary in the housing, the insulating plate having opposed first and second major side surfaces;
- a varistor element having opposed first and second major side surfaces, one of the opposed first and second major side surfaces of the varistor element being surface mounted to one of the opposed first and second major side surfaces of the insulating base plate;
- wherein the varistor element is operable in a high impedance mode and a low impedance mode in response to an applied voltage;
- first and second terminals for connecting the varistor element to an electrical circuit; and
- first and second disconnect elements operable to disconnect the varistor element in response to distinct operating conditions in the electrical circuit.

38. The device of claim 37, further comprising a first terminal connected to the other of the opposed first and second major side surfaces of the varistor element.

39. The device of claim 38, further comprising a second terminal connected to at least one of the first and second disconnect elements.

40. The device of claim 39, wherein the first and second terminals comprises blade terminals projecting from a common side of the housing.

* * * * *